United States Patent
Harris et al.

[11] Patent Number: 4,978,084
[45] Date of Patent: Dec. 18, 1990

[54] SPOOL FOR PHOTOGRAPHIC FILM OR OTHER WEB MATERIAL

[75] Inventors: Clark E. Harris; Joel R. Shaw, both of Fairport, N.Y.

[73] Assignee: Eastman Kodak Company, Rochester, N.Y.

[21] Appl. No.: 396,268

[22] Filed: Aug. 21, 1989

[51] Int. Cl.⁵ .................... B65H 75/28; G03B 17/26
[52] U.S. Cl. ...................................................... 242/74
[58] Field of Search .................. 242/74, 74.1, 71.8

[56] References Cited

U.S. PATENT DOCUMENTS

| 1,930,144 | 10/1933 | Kodak | 242/74 |
| 3,361,380 | 1/1968 | Fuji | 242/374 |
| 4,834,310 | 5/1989 | Konica | 242/74 |
| 4,852,821 | 8/1989 | Harris et al. | 242/74 X |

FOREIGN PATENT DOCUMENTS 3447215  5/1988  Fed. Rep. of Germany .

Primary Examiner—Daniel P. Stodola
Assistant Examiner—Paul Thomas Bowen
Attorney, Agent, or Firm—Charles E. Snee, III

[57] ABSTRACT

A spool for photographic film has a generally cylindrical core with flanges at the end portions of the core. A slot through the core receives an end portion of the film that is to be wound onto the spool. Hooks in the slot are engaged with the film through apertures in the film for attaching of the film to the spool. In order to avoid locking of two spools together during bulk handling, as can occur when a flange of one spool enters the slot of another spool, the outer edge of one wall defining the slot is chamfered and generally V-shaped. The edge of the wall forms a large obtuse angle and is substantially aligned with the tip ends of the hooks so that the chamfered wall and the tip ends prevent a spool flange from becoming locked in the slot of another spool.

11 Claims, 4 Drawing Sheets

4,978,084

SPOOL FOR PHOTOGRAPHIC FILM OR OTHER WEB MATERIAL

BACKGROUND OF THE INVENTION

The present invention relates to spools for film or other web material wherein the spool has a slot with a hook in the slot for engaging the film through apertures in an end portion of the film.

Spools for film and other webs may have a slot through the core of the film with hooks in the slot for engagement with the film through apertures in the film. Such spools are known, for example, from copending U.S. patent application Ser. No. 237,027, filed Aug. 29, 1988 in the names of Clark E. Harris et al and entitled "Spool for Web-Shaped Film", now U.S. Pat. No. 4,852,821. A spool as disclosed in such application is generally designated 10 in FIGS. 1 and 2 and comprise a generally cylindrical core 12 on which film is wound and a pair of annular flanges 14 at the end portions of the core. A slot 16 extends through the core 12 of the spool and has an entrance end 17 and an exit end 19. Two hooks 18 project into the slot from a wall 20 at one side of the slot. A rib 22 on a second wall 24 projects into the slot between the hooks 18 and serves to deflect the film downwardly over the hooks as it is initially fed through the slot 16 from the right toward the left as viewed in FIG. 2. Wall 20 of the spool has a narrow notch 26 immediately below rib 22. As shown in FIG. 1, the notch does not extend axially into the area of wall 20 beneath the tip ends of the hooks or between the hooks and the exit end of the slot.

Spools of this kind are manufactured on molding machines and placed in containers in bulk form for transport to spooling apparatus. In the spooling equipment the spools may be placed in a vibrating hopper, for example, which automatically separates individual spools from the other spools and feeds them sequentially to a winding station of the spooling apparatus.

During the bulk handling of the spools as described above, it is possible for a flange 14 of one spool to become locked in the exit end 19 of the slot of another spool, as illustrated in FIGS. 1 and 2. This can occur because the thickness of flanges 14 of the spools is approximately equal to or a little smaller than the spacing between the bottom of rib 22 and the top of wall 20. Also, as best shown in FIG. 1, the arcuate portion of the flange 14 that can enter the exit end of the slot is wider than the notch 26. If two spools become locked together, the spools cannot be separated and fed sequentially to the winding station of the spooling apparatus as described above. As is apparent from FIG. 2, a flange 14 can penetrate the exit end of the slot 16 only to a limited extent, i.e., until the flange reaches the adjacent tip ends of the hooks 18, because the tip ends of the hooks are spaced from wall 20 by a distance less than the thickness of the flanges 14.

This locking problem could be avoided by increasing the thickness of flange 14 or rib 22. However, hundreds of millions of spools of this type may be made each year by large film manufacturers, and the additional cost of even an incremental increase in material used for forming the spools can significantly increase the cost of producing the spools. Moreover, an increase in the width of flange 14 can result in deviations from standard specifications and may adversely effect performance of the spools in cassettes formed around the spools or in film processing equipment. Accordingly, it is desirable to solve the locking problem without increasing the cost of the spools, and it is even more desirable if the problem can be solved by further reducing the amount of material used in the spool to thereby further reduce its cost.

SUMMARY OF THE INVENTION

It is an object of the invention to provide an improved spool for film or other web materials having a slot through the core of the spool and flanges at the ends thereof wherein the locking problem described above is avoided. Another object of the invention is to avoid the locking problem of prior spools and also to reduce the amount of material needed for producing the spools.

BRIEF DESCRIPTION OF THE DRAWINGS

In the detailed description of the preferred embodiment of the invention presented below, reference is made to the accompanying drawings in which.

DETAILED DESCRIPTION OF THE INVENTION

Figure 1:
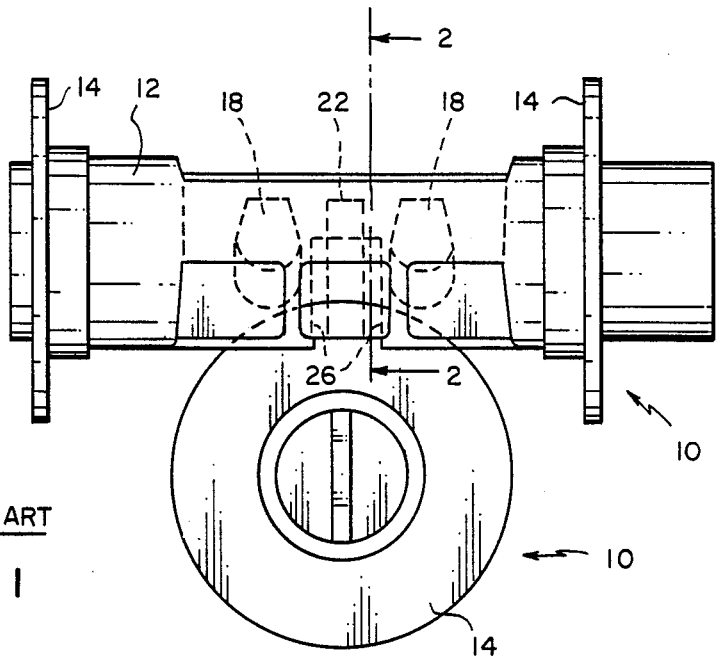
FIG. 1 is an elevation view illustrating two prior art spools locked together in the manner previously described.

A spool of the invention is generally designated 30 in FIGS. 3–7. A strip of web material, such as a film strip 32, can be attached to the spool and wound onto the spool. Film strip 32 has a narrow end portion 34 with a pair of spaced apertures 36 near the end of the narrow portion of the film.

Spool 30 has a core 40 with a generally cylindrical surface 42 and a pair of end flanges 44 at end portions of the core. The spool core has two spaced walls 46, 48 which extend completely through the core and define a generally rectangular slot 50. The facing surfaces of walls 46, 48 are generally parallel to each to each other and are spaced apart by a distance greater than the thickness of the end portion 34 of the film 32. The slot 50 has an entrance end 52 and an exit end 54. The entrance end 52 of the slot receives the narrow end portion 34 of the film strip for attachment of the film strip to the spool as described in more detail later.

A pair of hooks 56, 58 project from the wall 46 in spaced relation to each other. The hooks have tip ends 60, 62 which project toward the exit end 54 of the slot and are in spaced relation to wall 46, thereby forming a space for receiving the portion of the film strip between apertures 36 and the end of the film shown at the right of apertures 36 in FIG. 3. The space between tip ends 60, 62 of the hooks and the adjacent surface of wall 46 is less than the thickness of flanges 44 so the flanges cannot become locked under the tip ends of the hooks.

A center rib 64 and a pair of end ribs 66, 68 are formed on wall 48 and project downwardly therefrom (as viewed in FIG. 5) into the slot 50. Rib 64 is at the center of the slot and between the hooks 56, 58. Rib 64 is at the center of the slot and equally spaced from ribs 66, 68. Ribs 66, 68 are between the ends of the slot and one of the hooks. The ribs each extend substantially from the entrance end 52 of the slot to the exit end 54 and are generally parallel to each other with the rib 64 being substantially along the center of the slot. All three ribs are adjacent to the hooks but spaced from the wall 46 to enable the film strip to pass under the ribs.

When the end portion 34 of the film strip is inserted into the slot through the entrance end 52 toward the exit end 54 the leading end of the film strip engages the ribs and the upper surface of the hooks to deflect the film strip into a wavy configuration. Due the the natural tendency of the film strip to remain flat, the ribs 64, 66 and 68 effectively urge the strip downwardly onto the hooks so that when the apertures 36 become aligned with the hooks, the film strip drops down over the hooks with the apertures 36 positioned around the hooks. Initial rotation of the spool brings the portion of the film strip between the apertures 36 and the end of the film strip into the space underneath the tip ends 60, 62 of the hooks for securing the film strip to the spool. Continued rotation of the spool winds the film strip onto the spool in a known manner. Spools as generally described above are disclosed in the beforementioned copending U.S. patent application Ser. No. 237,027.

The thickness of each flange 44 of the spool 30 is equal to or slightly smaller than the spacing between the ribs and the adjacent surface of wall 46 of the spool. As explained before, the prior art spool 10 also has the same relationship between the spool flange 14 and the spacing between the rib 22 and the surface of wall 20.

The edge of wall 46 of spool 30 at the exit of slot 54 is tapered so that a spool flange will not become locked in the space beneath the rib 64. More specifically, the edge of wall 46 is chamfered so that it is generally V-shaped as shown best in FIGS. 3, 4 and 6. The edge of wall 46 comprises chamfered portions 70, 72 which taper from a point near the outer surface 42 of the core beginning adjacent the side edges of wall 46. Portions 70, 72 of the edge of wall 46 taper inwardly toward the entrance end 52 of the slot and the axial center of the slot between the spool flanges 44. Edge portions 70, 72 define a wide obtuse angle. The edge of wall 46 further comprises portions 74, 76 that extend from chamfered portions 70, 72 further into slot 50 between the hooks 56, 58 and on opposite sides of rib 64 to form a narrow open notch that is located directly beneath the portion of rib 64 at the exit end 54 of the slot. This shape of the edge of wall 46 leaves a large open space opposite the surface of wall 48 at the exit end of the slot.

Figure 4:
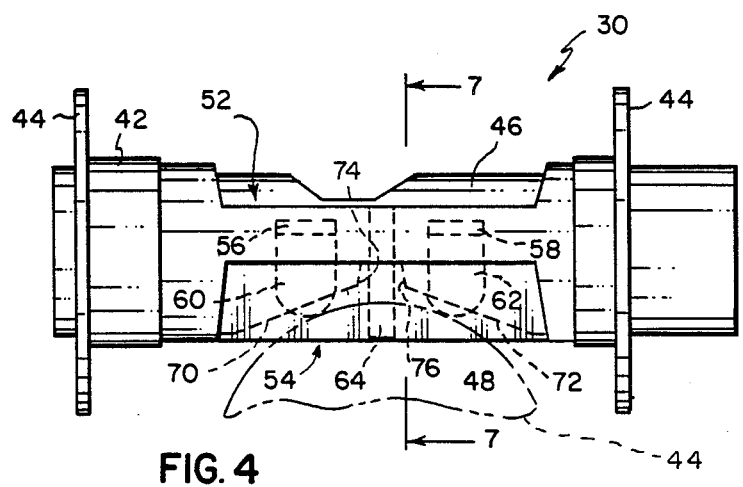
FIG. 4 is an elevation view of the spool of the invention.
Figure 5:
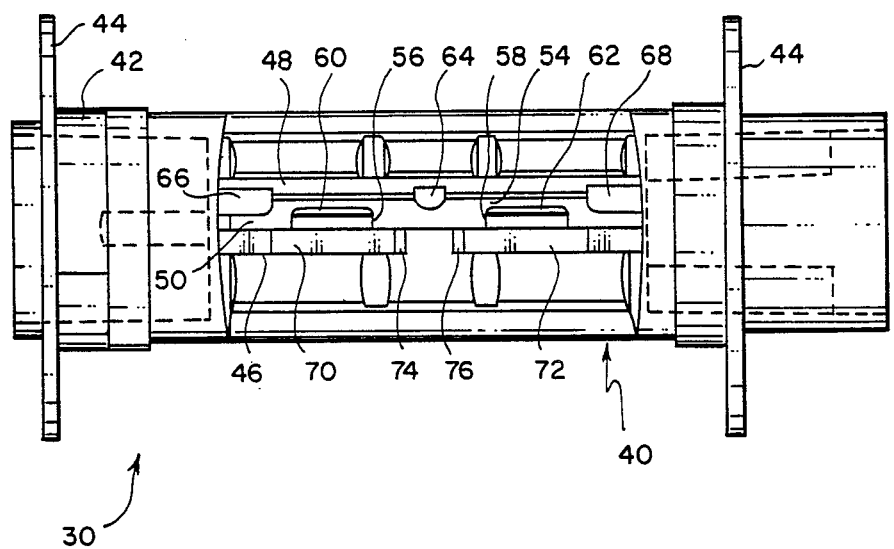
FIG. 5 is an elevation view of the spool of the invention rotated 90° about its axis with respect to FIG. 4 and looking into the exit end of the slot in the spool.
Figure 6:
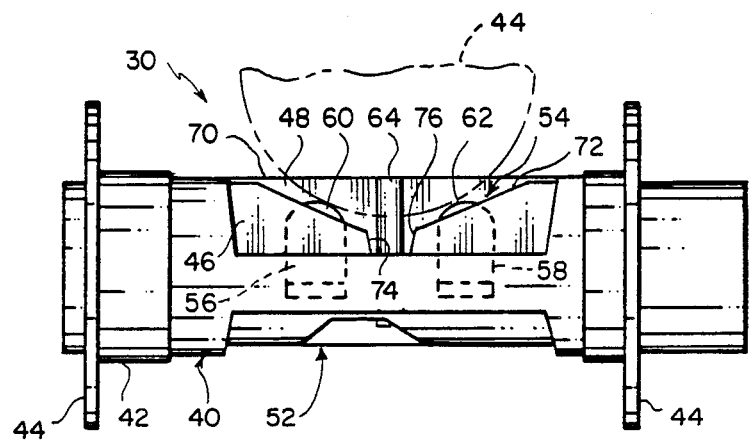
FIG. 6 is another elevation view of the spool roated 180° about its axis relative to the position shown in FIG. 4.

As best illustrated in FIGS. 4 and 6, the tip ends 60, 62 of the hooks nearest the exit end 54 of the slot extend past but are substantially aligned with the edge portions 70, 72, respectively, of the wall 46. As explained earlier, the spacing between the tip ends of the hooks and wall 46 prevents a flange 44 from being inserted into the space. The chamfered edge portions 70, 72 of wall 46 prevent the flange 44 of one spool from becoming locked between the rib 64 and wall 46 during bulk handling. More specifically, and as best shown in FIGS. 4 and 6, any tendency during bulk handling to force a flange 44 of one spool into the space between walls 46, 48 at the exit end of 54 of another spool is blocked by the tip ends 60, 62 of the hooks and the fact that they are substantially aligned with the chamfered edge portions 70, 72. Thus the wide V-shaped edge of wall 46 and its location relative to the tip end portions of the hooks prevent locking of a flange 44 of one spool into the space between the two walls 46, 48 at the exit end of another spool slot. Also, the large obtuse angle defined by edge portions 70, 72 is related to the diameter of spool flanges 44 so that no portion of wall 46 overlaps the flange when the flange shown in phatom is positioned as shown in FIGS. 4 and 6.

Figure 7:
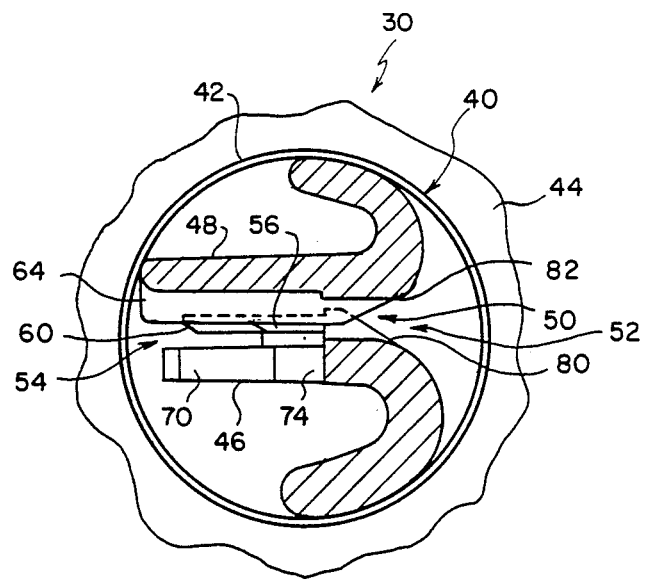
FIG. 7 is a cross section view taken along line 7—7 in FIG. 4.

As shown in FIG. 7, a flange of one spool cannot be forced into the entrance end 52 of the slot of another spool 52 of the slot due to the tapered surfaces 80, 82 on the hooks 56, 58 and the center rib 64. This configuration of the hooks and ribs at the entrance end of the slot can be the same or similar to that of the prior spool as shown in FIG. 2.

Figure 2:
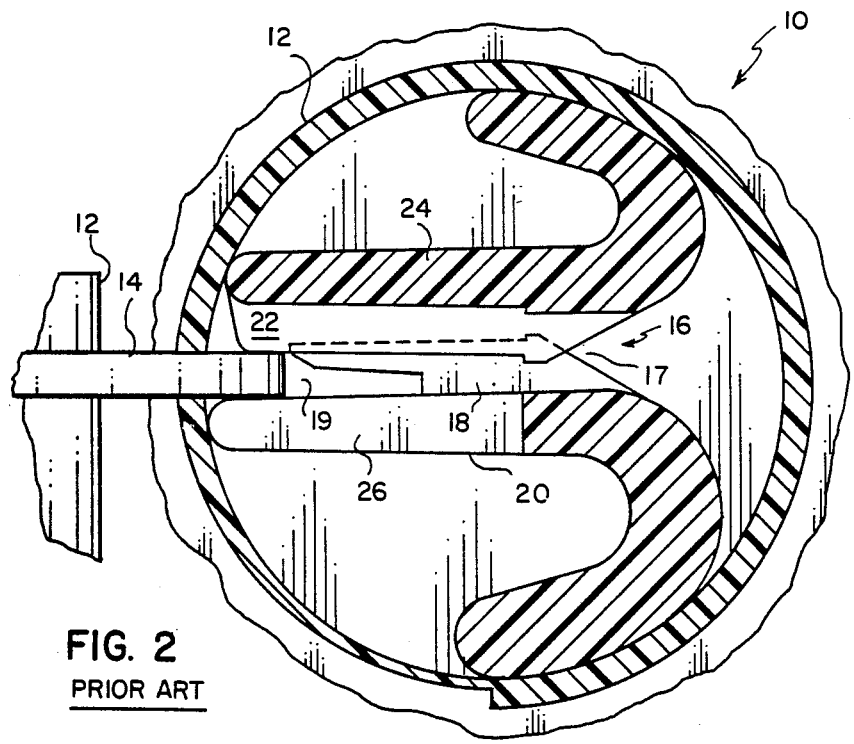
FIG. 2 is an enlarged cross section view taken along line 2—2 of FIG. 1.
Figure 3:
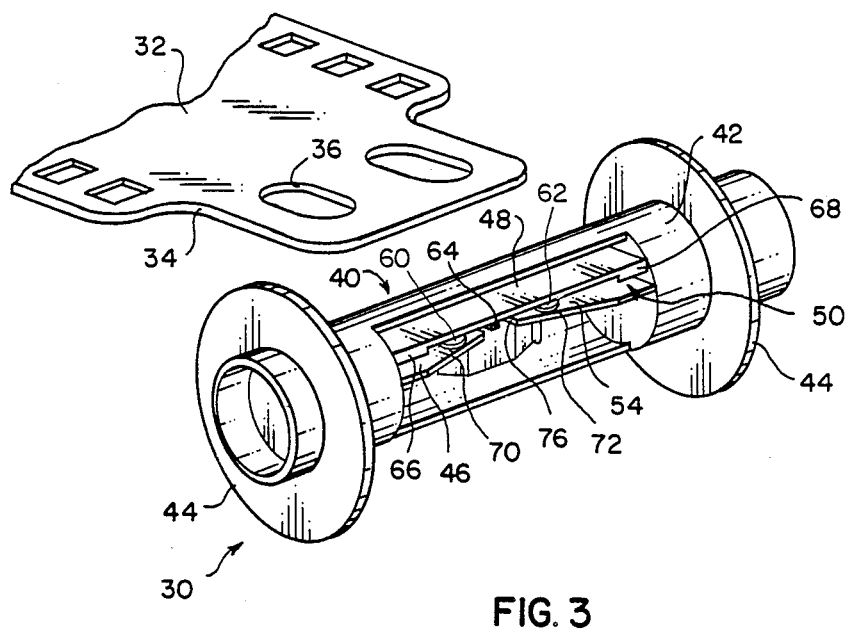
FIG. 3 is a perspective view of a film spool of the present invention and illustrating an end portion of a strip of film positioned for insertion into a slot of the spool.

The spool of the invention has proved effective in solving the locking problem encountered by the prior spool shown in FIGS. 1 and 2. This problem has been solved without changing the usual dimensions of the spool flanges so the spool will perform in the usual way in cassettes and processing equipment. Also, the chamfered portions 70, 72 of wall 46 reduce the material required for forming wall 46, thereby decreasing the cost of manufacturing the spool.

The invention has been described in detail with particular reference to a preferred embodiment thereof, but it will be understood that variations and modifications can be effected within the spirit and scope of the invention.

We claim:

1. In a spool for a strip of a web having at least one aperture in an end portion of the web for attaching the web to the spool, the spool having a core with an outer surface and first and second spaced walls extending through the core and defining a slot, the facing surfaces of the walls being generally parallel to each other, the slot having an entrance end for receiving the end portion of the web with the aperture and an exit end, at least one hook projecting from the first wall into the slot for engagement with the at least one aperture in the web to attach the end portion of the web to the spool, the hook having a tip end facing the exit end of the slot and spaced from the first wall so that the end portion of web can be received between the tip end and the first wall when the web is being attached to the spool, at least one rib projecting from the second wall for urging the web toward the hook as the web is inserted into the slot, the rib extending from the entrance end of the slot towarde the exit end of the slot, the rib being adjacent the at least one hook and spaced from the first wall, and the spool having flanges projecting from end portions of the core, the flanges having a thickness slightly smaller than the spacing between the rib and the first wall, the tip end of the at least one hook being sufficently close to the first wall so that the tip end of the at least one hook blocks a flange of a similar spool from entering the space between the first wall and the tip end of the at least one hook, the improvement comprising:

the first wall having an edge at the exit end of the slot that is tapered inwardly from near the outer surface of the core and adjacent the side edges of the wall toward the entrance end of the slot and the center of the slot, the tip end of the at least one hook nearest the exit end of the slot extending past said tapered edge of the first wall and being close enough to the rib to prevent a spool flange of a similar spool from becoming locked between the rib and the first wall during bulk handling of a plurality of such spools.

2. In a spool as set forth in claim 1 wherein the rib extends substantially the full distance from the entrance end to the exit end of the slot, and the hook is attached to the first wall adjacent the entrance end of the slot, the hook and rib being located relative to each other at the entrance end of the slot to prevent a flange of a similar spool from being positioned between the hook and rib.

3. In a spool as set forth in claim 1, wherein there are two hooks projecting from the first wall, said hooks being spaced from each other, the rib on the second wall being between said hooks, and said tapered edge of the first wall being adjacent both hooks to prevent a flange of a similar spool from being inserted between the first wall and either hook.

4. In a spool for a strip of web having spaced apertures in an end portion of the web for attaching the web to the spool, the spool having a core with an outer surface on which the web can be wound, first and second spaced walls extending through the core and defining a slot, the facing surfaces of the walls being generally parallel to each other, the slot having an entrance end for receiving the end portion of the web and an exit end, a pair of spaced hooks projecting from the first wall into the slot for engagement with the apertures in the web to attach the end portion of the web to the spool, the hooks each having a tip end facing the exit end of the slot and spaced from the first wall so that the end portion of the web can be received between the tip end and the first wall when the web is being attached to the spool, at least one rib projecting from the second wall for urging the web toward the hooks as the web is inserted into the slot, the rib extending from the entrance end of the slot toward the exit end of the slot between the hooks, the rib being adjacent the hooks and spaced from the first wall, and the spool having flanges projecting from end portions of the core, the flanges having a thickness slightly smaller than the spacing between the rib and the first wall, the tip ends of the hooks being sufficiently close to the first wall so that the tip ends of the hooks block a flange of a similar spool from entering the space between the first wall and the tip ends of the hooks, the improvement comprising;

the first wall having a V-shaped edge at the exit end of the slot defining a large obtuse angle, the edge having portions that are tapered inwardly from near the outer surface of the core and adjacent the side edges of the wall toward the entrance end of the slot and the center of the slot, the tip ends of the hooks nearest the exit end of the slot being substantially aligned with the edge of the tapered portions of the first wall and being close enough to the rib to prevent a spool flange of a similar spool from becoming locked between the rib and the first wall during bulk handling of a plurality of such spools.

5. In a spool as set forth in claim 4 wherein the rib extends substantially the full distance from the entrance end to the exit end of the slot, and the hook is attached to the first wall adjacent the entrance end of the slot, the hook and rib being located relative to each other at the entrance end of the slot to prevent a flange of a similar spool from being positioned between the hook and the rib.

6. In a spool as set forth in claim 4 wherein said tapered edge of said first wall is adjacent both hooks to prevent a flange of a similar spool from being inserted between the first wall and either hook.

7. In a spool as set forth in claim 4 wherein the tip ends of said hooks nearest the exit end of the slot extend past the edge of the tapered portions of the first wall.

8. In a spool for a strip of a web having at least one aperture in an end portion of the web for attaching the web to the spool, the spool having a core with an outer surface and first and second spaced walls extending through the core and defining a slot, the facing surfaces of the walls being generally parallel to each other, the slot having an entrance end for receiving the end portion of the web with the aperture and an exit end, at least one hook projecting from the first wall into the slot for engagement with the at least one aperture in the web to attach the end portion of the web to the spool, the hook having a tip end facing the exit end of the slot and spaced from the first wall so that the end portion of web can be received between the tip end and the first wall when the web is being attached to the spool, at least one rib projecting from the second wall for urging the web toward the hook as the web is inserted into the slot, the rib extending from the entrance end of the slot toward the exit end of the slot, the rib being adjacent the at least one hook and spaced from the first wall, and the spool having flanges projecting from end portions of the core, the flanges having a thickness slightly smaller than the spacing between the rib and the first wall, the tip end of the at least one hook being sufficiently close to the first wall so that the tip end of the at least one hook blocks a flange of a similar spool from entering the space between the first wall and the tip end of the at least one hook, the improvement comprising:

the first wall having an edge at the exit end of the slot, said edge commencing near the outer surface of the core and adjacent the side edges of the wall, said edge comprising first and second portions each of which is angled inwardly from the outer surface toward the entrance end of the slot and toward the axial center of the slot, said first and second portions defining an obtuse angle in said edge, the tip end of the at least one hook nearest the exit end of the slot being substantially aligned with one of said first and second portions and being close enough to the rib to prevent a spool flange of a similar spool from becoming locked between the rib and the first wall during bulk handling of a plurality of such spools.

9. In a spool as set forth in claim 8 wherein the rib extends substantially the full distance from the entrance end to the exit end of the slot, and the at least one hook is attached to the first adjacent the entrance end of the slot, the hook and rib being located relative to each other at the entrance end of the slot to prevent a flange of a similar spool from being positioned between the hook and rib.

10. In a spool as set forth in claim 8, wherein there are two hooks projecting from the first wall, said hooks being spaced from each other, the rib on the second wall being between said hooks, and each of said angled portions of said edge of the first wall being adjacent one of said hooks to prevent a flange of a similar spool from being inserted between the first wall and either hook.

11. In a spool as set forth in claim 8, wherein the tip end of the at least one hook nearest the exit end of the slot extends past the edge of the first wall at the exit end of the slot.

* * * * *